United States Patent Office 3,544,574
Patented Dec. 1, 1970

3,544,574
THIAMINE HALOPHENYLALKYL DISULFIDES
Hiroshi Hirano, Mitsuo Numata, and Noboru Shimahara, Suita, and Kiyohisa Kawai, Kyoto-fu, Japan, assignors to Takeda Chemical Industries, Ltd., Osaka, Japan
No Drawing. Filed Mar. 4, 1968, Ser. No. 709,920
Claims priority, application Japan, Mar. 3, 1967, 42/13,475; May 27, 1967, 42/33,818
Int. Cl. C07d 51/42
U.S. Cl. 260—256.5       7 Claims

ABSTRACT OF THE DISCLOSURE

Thiamine derivatives of the formula

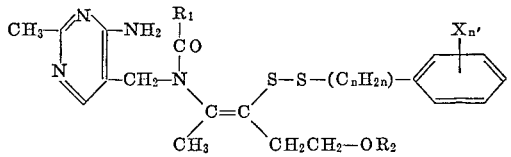

wherein $R_1$ is a hydrogen atom or $\alpha$-hydroxyethyl, $n$ is an integer from 1 to 5 inclusive, $R_2$ is a hydrogen atom, an acyl of carboxylic acid having up to 8 carbon atoms, an alkoxycarbonyl having up to 4 carbon atoms or phosphono, $n'$ is an integer from 1 to 3 inclusive and each X is a halogen, having outstanding anti-inflammatory, analgesic and anti-pyretic activity as well as thiamine activity with remarkably low toxicity to mammals.

---

This invention relates to novel and useful thiamine derivatives.

More particularly, the present invention relates to thiamine derivatives of the formula

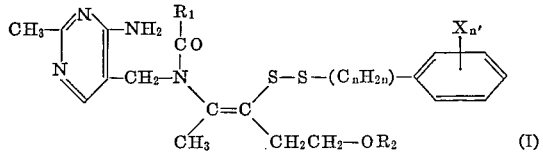

wherein $R_1$ is a hydrogen atom or $\alpha$-hydroxyethyl, $n$ is an integer from 1 to 5 inclusive, $R_2$ is a hydrogen atom, an acyl of carboxylic acid having up to 8 carbon atoms, an alkoxycarbonyl having up to 4 carbon atoms or phosphono, $n'$ is an integer from 1 to 3 inclusive and each X is a fluorine, chlorine, bromine or iodine atom.

As regards the above-mentioned Formula I, the alkylene represented by —($C_nH_{2n}$)— is exemplified by a straight or branched alkylene, such as —$CH_2$—, —$CH_2$—$CH_2$—, —$CH_2$—$CH_2$—$CH_2$—,

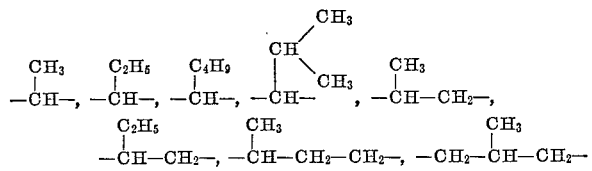

etc.; the acyl of carboxylic acid is exemplified by formyl, acetyl, propionyl, valeroyl, caproyl, benzoyl, furoyl, nicotinoyl, 2-hydroxybenzoyl, 4-methylbenzoyl, 4-chlorobenzoyl, etc.; the alkoxycarbonyl is exemplified by methoxycarbonyl, ethoxycarbonyl, propoxycarbonyl, etc.

These novel thiamine derivatives of Formula I have outstanding anti-inflammatory, analgesic and anti-pyretic activities as well as thiamine activity with remarkable low toxicity to mammals.

It is an object of the present invention to provide the novel and useful thiamine derivatives of Formula I. Another object is to provide a method for producing the thiamine derivatives of Formula I. Further objects will be clear from the description which follows.

Typical thiamine derivatives of the present invention are the following presently preferred compounds:

thiamine 4-chlorobenzyl disulfide;
thiamine 2-fluorobenzyl disulfide;
thiamine 4-bromobenzyl disulfide;
thiamine 2-iodobenzyl disulfide;
thiamine 2,6-dichlorobenzyl disulfide;
thiamine 2-chloro-6-fluorobenzyl disulfide;
thiamine 2-chloro-3-fluorobenzyl disulfide;
thiamine 2-chloro-6-bromobenzyl disulfide;
O-acetylthiamine 2-fluorobenzyl disulfide;
O-benzoylthiamine 2,6-dichlorobenzyl disulfide;
hydroxyethylthiamine 2,6-dichlorobenzyl disulfide;
thiamine 2-(2-chlorophenyl)ethyl disulfide;
thiamine 2-(4-fluorophenyl)ethyl disulfide;
thiamine 2-(2,6-dichlorophenyl)ethyl disulfide;
thiamine 3-(2-chlorophenyl)propyl disulfide;
thiamine 3-(2,6-dichlorophenyl)propyl disulfide;
thiamine 1-(2-chlorophenyl)ethyl disulfide;
thiamine 1-(2-fluorophenyl)ethyl disulfide;
thiamine 1-(2,6-dichlorophenyl)propyl disulfide;
thiamine 1-(2-chlorophenyl)butyl disulfide;
thiamine 1-(2-fluorophenyl)pentyl disulfide;
thiamine 1-methyl-2-(2-chlorophenyl)ethyl disulfide;
thiamine 1-ethyl-2-(2-bromophenyl)ethyl disulfide;
thiamine 1-methyl-3-(2-chlorophenyl)propyl disulfide;
thiamine O-monophosphate 1-methyl-2-(2-chlorophenyl) ethyl disulfide;
O-benzoylthiamine 2,4-dichlorobenzyl disulfide;
O-ethoxycarbonylthiamine 1-(2-chlorophenyl)ethyl disulfide;
O-nicotinoylthiamine 1-(4-bromophenyl)ethyl disulfide;

as well as the respective salts with inorganic or organic acids, especially pharmaceutically acceptable acids such as hydrochloric acid, nitric acid, methane-sulfonic acid, toluene-sulfonic acid and the like.

Throughout the present specification as well as the claims the numerical order of branches is counted from the thiamine residue.

Most advantageous compounds among the compounds of Formula I are those wherein the alkylene represented by —($C_nH_{2n}$)— stands for methylene, 1,1-alkylene as shown by $$-\overset{R'}{\underset{|}{C}H}-$$

ethylene, 1-alkylethylene as shown by $$-\overset{R''}{\underset{|}{C}H}-CH_2-$$

wherein $R'$ is an alkyl having up to 4 carbon atoms and $R''$ is an alkyl having up to 3 carbon atoms.

In the preparation of the thiamine derivatives of this invention, one reactant having the formula

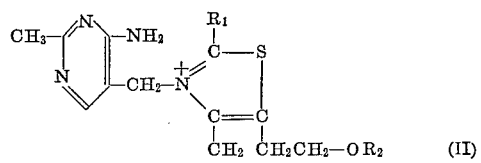

wherein $R_1$ and $R_2$ are as precedingly defined, is allowed to react with another reactant having the formula

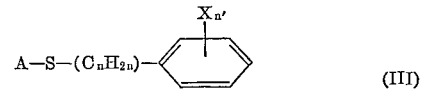

wherein $n$, $X$ and $n'$ are as precedingly defined and A is an active radical which can form a disulfide structure by reaction with a mercaptan compound.

The compounds of Formula II, namely, thiamine and its derivatives, are generally available as acid salts such as hydrochloride, nitrate and sulfate and these acid salts are all usable in the present invention. As the active radical A which can form a disulfide structure by reaction with a mercaptan compound, for example, A stands for —$SO_3M$,

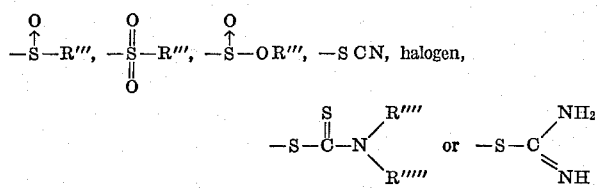

wherein $R'''$ is a hydrocarbon residue having up to 8 carbon atoms such as methyl, propyl, phenyl or a radical represented by the formula

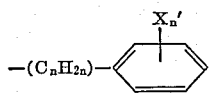

in which $n$, $X$ and $n'$ are as precedingly defined, each of $R''''$ and $R'''''$ is a hydrogen atom, a hydrocarbon residue having up to 8 carbon atoms or $R''''$ and $R'''''$ are, taken together with the adjoining nitrogen atom, a five- or six-membered heterocyclic radical such has morpholino, piperidino, pyrrolidino, and M is an alkali metal or univalence of alkaline earth metal.

In general, among the compounds of Formula III those wherein A stands for —$SO_3M$ are most advantageously employed.

The compounds (III) wherein A is —$SO_3M$ are prepared, for example, by reacting the compounds having the formula

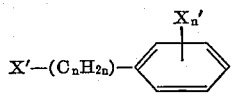

wherein $X$, $n$ and $n'$ are as precedingly defined and $X'$ stands for a halogen such as chlorine and bromine, with a compound having the formula $M_2S_2O_3$, wherein M has the significance previously set forth.

In the method of the present invention, one of the compounds (III) is allowed to react with a thiol-type thiamine derivative corresponding to the Formula II.

It is generally known that thiamine derivatives exist in an aqueous solution in the state of equilibrium between the ammonium-type and the thiol-type, and that the equilibrium shifts to the thiol-type under an alkaline condition and to the ammonium-type under an acid condition, as shown below:

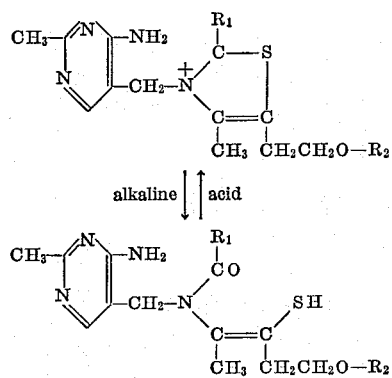

Accordingly, the reaction of the present invention proceeds smoothly at a neutral or alkaline condition.

Especially, it is preferable to carry out the reaction of this invention at an alkaline condition by adding an alkaline reagent such as sodium hydroxide, potassium hydroxide, ammonia, etc. The most advantageous pH lies in between about 9 and about 13.

The reaction is carried out in a solvent such as water, a lower alcohol (e.g. methanol or ethanol), acetone, a lower alkyl acetate (e.g. ethyl acetate), their mixtures, but other solvents which do not injure the reaction system may be used.

Generally, the reaction proceeds smoothly at room temperature (about 10° to 30° C.). However, it may be carried out with cooling or heating, so as to control the reaction velocity.

The thiamine derivatives (I) of the present invention thus produced may be isolated as the free base or as the salt form with an inorganic or organic acid such as hydrochloric acid, nitric acid, methanesulfonic acid, toluenesulfonic acid, and the like. Generally, such a means as concentration of the reaction mixture, precipitation by adding any other solvent, or recrystallization, can be carried out.

The novel thiamine derivatives of Formula I are characterized by their remarkable physiological properties:

(1) One of the characteristics of the present compounds is their low toxicity as shown by the following tests.

A gum arabic emulsion of each test compound was administered orally to male rats weighing 180 to 200 grams (SD–JCL strain) and $LD_{50}$ was calculated on the number of rats that died during 8 days after the administration. The result is shown in Table 1, which demonstrates that the compounds of the present invention are significantly less toxic than thiamine benzyl disulfide, acetylsalicylic acid, phenylbutazone and aminopyrine.

TABLE 1

| Test compounds: | $LD_{50}$ (mg./kg. in rats), about |
|---|---|
| Thiamine 2-fluorobenzyl disulfide | 5500 |
| Thiamine 2-chlorobenzyl disulfide | 6000 |
| Thiamine benzyl disulfide | 3500 |
| Acetylsalicylic acid | 1000 |
| Phenylbutazone | 750 |
| Aminopyrine | 1000 |

(2) One of the characteristics of the present thiamine derivatives (I) is their outstanding anti-inflammatory effect as shown by the following tests.

According to the method of Winter et al. described in "Proceedings of the Society for Experimental Biology and Medicine," vol. 111, p. 544, groups of male rats weighing 180 to 200 grams (SD–JCL strain, 6 heads per group) were measured by their right foot volume. Test compounds in aqueous solution or in aqueous suspension were orally administered to the rats. The rats of the control group received only the solvent. 1 hour after the said treatment, 0.05 ml. of 1% suspension of carrageenin in a saline solution was injected into the plantar tissue of the right hind paws of all rats. 3 hours later, the volume of the injected feet was measured, and the percentages of the inhibition of the edema relative to the control and the therapeutic indexes were measured with regard to each test compound. The result is summarized in Table 2, which shows that the compounds of the present invention have much higher "therapeutic indexes" than those of thiamine benzyl disulfide, acetylsalicylic acid and phenylbutazone.

TABLE 2

| Test compound | Oral dose, mg./kg. | Inhibition of edema, percent | Minimum effective dose, mg./kg. | Therapeutic index ($\frac{LD_{50}}{\text{Minimum effective dose}}$) |
| --- | --- | --- | --- | --- |
| Thiamine 2-fluorobenzyl disulfide | 25<br>50 | 28.7<br>45.5 | 25 | 220 |
| Thiamine 2-chlorobenzyl disulfide | 25<br>50 | 28.4<br>38.0 | 25 | 240 |
| Thiamine benzyl disulfide | 25<br>50 | 8.9<br>27.9 | 50 | 70 |
| Acetylsalicylic acid | 100<br>200 | 17.5<br>27.5 | 150 | 6.3 |
| Phenylbutazone | 12.5<br>25<br>50 | 26.4<br>38.8<br>43.8 | 25 | 30 |

(3) The present compounds also have an outstanding analgesic effect.

Testing was according to the method of Koster et al. described in "Federation Proceedings," vol. 18, p. 412. Test compounds in aqueous solution or in aqueous suspension were orally administered to groups of male mice weighing 20 to 22 grams (ICR–JCL strain, 10 heads per group). The mice of the control group received only the solvent. 30 minutes after the said treatment, 0.1 ml./10 g. of 0.6% aqueous acetic acid solution was intraperitoneally injected to the mice of each group. Then the frequency of writhing episode of the mice was measured for 30 minutes and the percentage of the inhibition of the writhing syndrome relative to the control was measured with regard to each test compound. The result is summarized in Table 3, which shows that the compounds of the present invention show an analygesic action superior to that of thiamine benzyl disulfide, acetylsalicylic acid and phenylbutazone.

TABLE 3

| Test compound | Oral dose, mg./kg. | Inhibition of writhing syndrome percent |
| --- | --- | --- |
| Thiamine 2-fluorobenzyl disulfide | 25<br>50 | 48.7<br>66.7 |
| Thiamine 2-chlorobenzyl disulfide | 25<br>50 | 53.6<br>83.2 |
| Thiamine benzyl disulfide | 50<br>200 | 24.9<br>65.8 |
| Acetylsalicylic acid | 100<br>200 | 58.2<br>59.8 |
| Phenylbutazone | 100<br>200 | 36.6<br>61.2 |

(4) The present compounds also exhibit an outstanding anti-pyretic effect.

The anti-pyretic effect of the present compounds was tested by measuring the action of lowering pyrogen-supported temperatures in rates after the Winder et al. method described in "The Journal of Pharmacology and Experimental Therapeutics," vol. 138, p. 405.

That is to say, a 15% suspension of baker's yeast in a physiological saline solution was subcutaneously injected to male rats weighing 190 to 210 grams (SD–JCL strain, 6 heads per group) in a ratio of 1 milliliter per 100 grams of the rat weight. Food was then withdrawn, but the rats had access to water at all times. 18 hours after the administration of the said pyrogen, test compounds in aqueous solution or in aqueous suspension were orally administered to the rats. The rectal temperature of the rats was measured 1 hour, 2 hours, 3 hours and 4 hours after the administration of the test compounds. The temperature-lowering in the pyretic rats was summarized in Table 4 which shows the present compounds exhibit an anti-pyretic effect superior to that of thiamine benzyl disulfide and aminopyrine.

TABLE 4.—DROP OF BODY TEMPERATURE OF PYRETIC RATS (° C.)

| Test compound | Oral dose, mg./kg. | Time after administration (hours) | | | |
| --- | --- | --- | --- | --- | --- |
| | | 1 | 2 | 3 | 4 |
| Thiamine 2-fluorobenzyl disulfide | 12.5<br>25 | 0<br>0.4 | 0.65<br>1.85 | 1.45<br>2.10 | 1.40<br>2.20 |
| Thiamine 2-chlorobenzyl disulfide | 12.5 | 0.35 | 1.25 | 1.30 | 1.0 |
| Thiamine benzyl disulfide | 25 | 0.2 | 0.75 | 1.55 | 1.75 |
| Aminopyrine | 50 | 2.0 | 2.05 | 1.6 | 1.3 |

The thiamine derivatives (I) of the present invention can be used as anti-inflammatory, analgesic, and/or anti-pyretic agents for mammals.

The thiamine derivatives (I) can be administered in the free base form or in the form of the pharmaceutically acceptable salts as mentioned above. The thiamine derivatives (I) can be administered alone or in combination with pharmaceutically acceptable carriers. On application as anti-inflammatory agent, they can be administered alone or together with conventional anti-inflammatory agents such as acetylsalicylic acid or a steroidal anti-inflammatory agent. The thiamine derivatives (I) are administerable as powders, tablets, solutions or emulsions for oral administration, or as injections or suppositories. The choice of carriers is determined by the preferred route of administration, the solubility of the thiamine derivative and standard pharmaceutical practice.

The dose of the thiamine derivatives (I) is chosen depending upon the route of administration, the race of mammals and the purpose of administration. For instance, when thiamine 2-fluorobenzyl disulfide or thiamine 2-chlorobenzyl disulfide is orally administered to adult humans as anti-inflammatory agent or analgesic agent, the optimum dose lies in a range from 75 to 600 milligrams per day.

The following examples are solely for the purpose of illustration and are not to be construed as limitation of this invention. In these examples parts by volume bear the same relation to parts by weight as do milliliters to grams; analytical values are in percent.

EXAMPLE 1

A solution of 7.5 parts by weight of crystalline sodium thiosulfate in 45 parts by volume of water is mixed with a solution of 5.7 parts by weight of 2-fluorobenzyl bromide in 45 parts by volume of ethyl alcohol, and the resultant mixture is refluxed for 1 hour, and is concentrated under reduced pressure to give a crystalline residue. The residue is dissolved in 20 parts by volume of water, and the solution is subjected to extraction with 20 parts by volume of diethyl ether to give 20 parts by volume of an aqueous solution of sodium 2-fluorobenzyl-thiosulfate.

To a solution of 10.2 parts by weight of thiamine hydrochloride in 30 parts by volume of water, there is added a solution of 3.6 parts by weight of sodium hydroxide in 20 parts by volume of water, and the whole mixture is allowed to stand at room temperature for 30 minutes. To the solution is added with stirring at room temperature the aqueous solution of sodium 2-fluorobenzylthiosulfate to give colorless crystals of thiamine 2-fluorobenzyl disulfide. The yield is 6.7 parts by weight. Recrystallization from a mixture of chloroform and ethyl acetate gives colorless prisms melting at 132° to 134° C.

*Elementary analysis.*—Calc'd for $C_{19}H_{23}FN_4O_2S_2$ (percent): C, 54.00; H, 5.49; N, 13.26. Found (percent): C, 53.80; H, 5.69; N, 13.46.

EXAMPLE 2

An aqueous solution (10 parts by volume) of sodium 2-chlorobenzylthiosulfate is prepared from 1.6 parts by weight of 3-fluorobenzyl bromide and 2.5 parts by weight of crystalline sodium thiosulfate after the manner described in Example 1.

To a solution of 3.4 parts by weight of thiamine hydrochloride in 10 parts by volume of water, there is added a solution of 1.2 parts by weight of sodium hydroxide in 10 parts by volume of water, and the mixture is allowed to stand at room temperature for 30 minutes. To the solution is added with stirring at room temperature the aqueous sodium 3-fluorobenzylthiosulfate solution to give white crystals of thiamine 3-fluorobenzyl disulfide. The yield is 2.4 parts by weight. Recrystallization from chloroform and ethyl acetate gives granular crystals melting at 130° to 131° C.

*Elementary analysis.*—Calc'd for $C_{19}H_{23}FN_4O_2S_2$ (percent): C, 54.00; H, 5.49; N, 13.26. Found (percent): C, 54.28; H, 5.36; N, 12.98.

EXAMPLE 3

An aqueous solution (15 parts by volume) of sodium 2-chlorobenzylthiosulfate is prepared from 1.6 parts by weight of 2-chlorobenzyl chloride and 2.5 parts by weight of crystalline sodium thiosulfate after the manner described in Example 1.

To a solution of 3.4 parts by weight of thiamine hydrochloride in 10 parts by volume of water there is added a solution of 1.2 parts by weight of sodium hydroxide in 10 parts by volume of water and the mixture is allowed to stand at room temperature for 30 minutes. To the solution is added with stirring at room temperature the aqueous sodium 2-chlorobenzylthiosulfate solution to give oily substance. The reaction mixture is subjected to extraction with 50 parts by volume of chloroform. The extract is washed with water, dehydrated with anhydrous magnesium sulfate, and concentrated under reduced pressure to give oily substance. To the oily substance is added 20 parts by volume of petroleum ether to yield white powdery crystals of thiamine 2-chlorobenzyl disulfide. The yield is 2.3 parts by weight. Recrystallization from ethyl acetate gives colorless crystals melting at 126° to 127° C.

*Elementary analysis.*—Calc'd for $C_{19}H_{23}ClN_4O_2S_2$ (percent): C, 51.98; H, 5.28; N, 12.76. Found (percent): C, 51.89; H, 5.32; N, 12.57.

EXAMPLE 4

A solution of 2.35 parts by weight of S-2-chlorobenzylsulfenyl isothiourea in 15 parts by volume of diethyl ether is added to a solution of 3.4 parts by weight of thiamine hydrochloride and 1.2 parts by weight of sodium hydroxide in 20 parts by volume of water, the latter being prepared after the manner described in Example 1. The solution is allowed to stand under constant stirring for 30 minutes. The resultant mixture is subjected to extraction with 50 parts by volume of ethyl acetate. The extract is treated after the manner described in Example 3 to give colorless crystals of thiamine 2-chlorobenzyl disulfide.

EXAMPLE 5

To 30 parts by weight of glacial acetic acid, there is added 1.6 parts by weight of 2-chlorobenzyl disulfide, and to the mixture there is added dropwise under cooling 1.1 parts by volume of 32% hydrogen peroxide and the resultant mixture is allowed to stand at room temperature for 2 days. Then the mixture is concentrated under reduced pressure to give crude S-2-chlorobenzylsulfinyl-2-chlorobenzylmercaptan, to which is added 160 parts by volume of 70% ethyl alcohol, and into the mixture is dissolved 1.7 parts by weight of thiamine hydrochloride. The mixture is adjusted to pH 9 with 10% sodium hydroxide and is kept standing at 40° C. for 30 minutes. The reaction mixture is concentrated under reduced pressure to give residue. To the residue is added 30 parts by volume of water, and the mixture is subjected to extraction with 100 parts by volume of ethyl acetate. The ethyl acetate layer is subjected to extraction with 3% hydrochloric acid and the hydrochloric acid layer is neutralized with potassium carbonate to give crystals of thiamine 2-chlorobenzyl disulfide. Recrystallization from ethyl acetate gives colorless crystals melting at 126° to 127° C. No depression of melting point is observed when the product is melted with the product of Example 3.

EXAMPLE 6

An aqueous solution (15 parts by volume) of sodium 2-iodobenzylthiosulfate is prepared from 2.5 parts by weight of crystalline sodium thiosulfate and 3 parts by weight of 2-iodobenzyl bromide after the manner described in Example 1.

3.4 parts by weight of thiamine hydrochloride is dissolved in a solution of 1.2 parts by weight of sodium hydroxide in 20 parts by volume of water. The solution is allowed to stand at room temperature for 30 minutes, followed by the addition of the aqueous sodium 2-iodobenzylthiosulfate solution to give oily substance. The reaction mixture is subjected to extraction with 50 parts by volume of chloroform.

After being washed with water and dehydrated with anhydrous magnesium sulfate, the extract is concentrated under reduced pressure to give oily substance. To the oily substance is added 20 parts by volume of diethyl ether to yield white powdery crystals of thiamine 2-iodobenzyl disulfide. The yield is 3.7 parts by weight. Recrystallization from ethyl acetate gives colorless needles melting at 125° to 127° C.

*Elementary analysis.*—Calc'd for $C_{19}H_{23}IN_4O_2S_2$ (percent): C, 43.02; H, 4.36; N, 10.56. Found (percent): C, 43.12, H, 4.15; N, 10.28.

EXAMPLE 7

An aqueous solution (20 parts by volume) of sodium 2,6-dichlorobenzylthiosulfate is prepared from 5 parts by weight of crystalline sodium thiosulfate and 4.8 parts by weight of 2,6-dichlorobenzyl bromide after the manner described in Example 1.

To a solution of 6.8 parts by weight of thiamine hydrochloride in 20 parts by volume of water there is added a solution of 2.4 parts by weight of sodium hydroxide in 20 parts by volume of water and the mixture is allowed to stand at room temperature for 30 minutes. To the mixture is added the aqueous sodium 2,6-dichlorobenzylthiosoulfate solution at room temperature under constant stirring to give white crystals of thiamine 2,6-dichlorobenzyl disulfide. Recrystallization from a mixture of chloroform and ethyl acetate gives colorless powdery crystals melting at 154° to 155° C.

*Elementary analysis.* — Calc'd for $C_{19}H_{22}Cl_2N_4O_2S_2$ (percent): C, 48.20; H, 4.68. Found (percent): C, 48.43; H, 4.70.

The hydrochloride of this product forms white powdery crystals melting at 170° to 173° C.

EXAMPLE 8

A solution of 1.8 parts by weight of N-(S-2,6-dichlorobenzylsulfenyldithiocarboxy)morpholine in 50 parts by volume of chloroform is mixed with a solution of 0.8 part by weight of sodium hydroxide and 1.7 parts by weight of thiamine hydrochloride in 30 parts by volume of water, and the mixture is stirred at room temperature for 30 minutes. The chloroform layer is separated from the reaction mixture. The chloroform layer is washed with water and dehydrated with anhydrous sodium sulfate, and is concentrated under reduced pressure to give crystals of thiamine 2,6-dichlorobenzyl disulfide. Recrystallization from a mixture of chloroform and ethyl acetate gives crystals melting at 154° to 155° C. No depression of melting point is observed when the product is melted with the product of Example 7.

EXAMPLE 9

To a solution of 0.6 part by weight of sodium hydroxide in 20 parts of volume of water there is added 1.7 parts by weight of thiamine hydrochloride.

An aqueous solution (15 parts by volume) of sodium 2-bromo-6-chlorobenzylthiosulfate is prepared from 1.3 parts by weight of crystalline sodium thiosulfate and 1.4 parts by weight of 2-bromo-6-chlorobenzyl bromide after the manner described in Example 1, and the aqueous solution is added to the above-mentioned thiamine solution to give white crystals of thiamine 2-bromo-6-chlorobenzyl disulfide. The yield is 2 parts by weight. Recrystallization from ethyl acetate gives colorless feathery crystals melting at 141° to 143° C.

*Elementary analysis.*—Calc'd for $C_{19}H_{22}BrClN_4O_2S_2$ (percent): C, 44.05; H, 4.28; N, 10.82. Found (percent): C, 44.28; H, 4.34; N, 10.58.

EXAMPLE 10

To a solution of 1.6 parts by weight of N-(S-4-chlorobenzylsulfenyldithiocarboxy) morpholine in 30 parts by volume of chloroform there is added a solution of 1.7 parts by weight of thiamine hydrochloride and 0.8 part by weight of sodium hydroxide in 30 parts by volume of water. The resulting mixture is stirred at room temperature for 2 hours, then the mixture is subjected to extraction with 150 parts by volume of ethyl acetate. The extract is washed with water, dried, and concentrated under reduced pressure to give crystals of thiamine 4-chlorobenzyl disulfide. Recrystallization from a mixture of ethyl acetate and ligroin (2:1) gives colorless needles melting at 122° to 123° C.

*Elementary analysis.*—Calc'd for $C_{19}H_{23}ClN_4O_2S_2$ (percent): C, 51.98; H, 5.28; N, 12.76. Found (percent): C, 52.21; H, 5.50; N, 12.31.

EXAMPLE 11

An aqueous solution (30 parts by volume) of sodium 4-fluorobenzylthiosulfate is prepared from 7.5 parts by weight of crystalline sodium thiosulfate and 5.7 parts by weight of 4-fluorobenzyl bromide. The aqueous solution is added to a solution of 10.2 parts by weight of thiamine hydrochloride and 3.6 parts by weight of sodium hydroxide in 50 parts by volume of water to give white crystals of thiamine 4-fluorobenzyldisulfide. Recrystallization from ethyl acetate gives colorless prisms melting at 125° to 126° C.

*Elementary analysis.*—Calc'd for $C_{19}H_{23}FN_4O_2S_2$ (percent): C, 54.00; H, 5.49; N, 13.26. Found (percent): C, 53.83; H, 5.22; N, 12.99.

EXAMPLE 12

To a solution of 0.47 part by weight of hydroxyethylthiamine hydrochloride, and 1 part by volume of 15% sodium hydroxide in 5 parts by volume of water there is added dropwise with stirring at room temperature an aqueous solution (5 parts by volume) of sodium 2,6-dichlorobenzylthiosulfate which is prepared from 0.3 part by weight of 2,6-dichlorobenzyl bromide and 0.5 part by weight of crystalline sodium thiosulfate after the manner described in Example 1, whereupon oily substance separates out. The oily substance is subjected to extraction with 15 parts by volume of ethyl acetate. The ethyl acetate layer is washed with water, dried with anhydrous magnesium sulfate, and concentrated under reduced pressure to give oily residue. The residue is admixed with 20 parts by volume of petroleum ether under stirring to give white powdery crystals of hydroxyethylthiamine 2,6-dichlorobenzyl disulfide. The yield is 0.4 part by weight. Recrystallization from a mixture of benzene and petroleum ether (9:1) gives colorless granular crystals melting at 145° to 146° C.

*Elementary analysis.*—Calc'd for $C_{21}H_{26}Cl_2N_4O_3S_2$ (percent): C, 48.74; H, 5.06; N, 10.82. Found (percent): C, 48.61; H, 4.82; N, 10.71.

EXAMPLE 13

An aqueous solution (10 parts by volume) of sodium 2,6-dichlorobenzylthiosulfate is prepared from 0.5 part by weight of 2,6-dichlorobenzyl bromide and 0.5 part by weight of crystalline sodium thiosulfate after the manner described in Example 1.

To a solution of 1.1 parts by weight of O-benzoylthiamine hydrobromide in 5 parts by volume of water there is added 5 parts by volume of 5% sodium hydroxide, and the solution is allowed to stand at room temperature for 30 minutes. To the solution is added at room temperature with stirring the aqueous 2,6-dichlorobenzylthiosulfate solution to give oily substance. The oily substance is subjected to extraction with 10 parts by volume of ethyl acetate. The ethyl acetate layer is washed with water, dried with anhydrous magnesium sulfate, and concentrated under reduced pressure to give oily residue. The residue is admixed with 5 parts by volume of diethyl ether with stirring to give white powdery crystals of O-benzoylthiamine 2,6-dichlorobenzyl disulfide. The yield is 0.8 part by weight. Recrystallization from a mixture of ethyl acetate and diethyl ether gives white powdery crystals melting at 103° to 106° C.

*Elementary analysis.*—Calc'd for $C_{26}H_{26}Cl_2N_4O_3S_2$ (percent): C, 54.07; H, 4.53; N, 9.72. Found (percent): C, 54.51; H, 4.75; N, 10.54.

EXAMPLE 14

A solution of 2.6 parts by weight of S-3-chlorobenzylsulfenyl isothiourea hydrochloride in a mixture of 20 parts by volume of water and 10 parts by volume of ethyl alcohol is added to a solution of 3.4 parts by weight of thiamine chloride and 1.2 parts by weight of sodium hydroxide in 30 parts by volume of water. The mixture is stirred at room temperature for 5 minutes, followed by the adjustment of its pH to about 9.0, then further stirred for 5 minutes to give crystals of thiamine 3-chlorobenzyl disulfide. The yield is 2.8 parts by weight. Recrystallization from ethyl acetate gives colorless prisms melting at 129° to 131° C.

*Elementary analysis.*—Calc'd for $C_{19}H_{23}ClN_4O_2S_2$ (percent): C, 51.98; H, 5.28; N, 12.76. Found (percent): C, 52.36; H, 5.31; N, 12.60.

EXAMPLE 15

To a solution of 3.35 parts by weight of thiamine hydrochloride in 25 parts by volume of water there is added a solution of 1.2 parts by weight of sodium hydroxide in 3 parts by volume of water and the resultant solution is allowed to stand at room temperature for 30 minutes.

An aqueous solution (10 parts by volume) of sodium 2-(2-fluorophenyl)ethylthiosulfate is prepared from 2.04 parts by weight of 2-(2-fluorophenyl)ethyl bromide and 3.00 parts by weight of crystalline sodium thiosulfate after the manner described in Example 1. The aqueous solution is admixed with the said thiamine solution to give 3 parts by weight of oily substance soluble in chloroform. Crystallization of the oily substance from benzene gives colorless prisms of thiamine 2-(2-fluorophenyl)ethyl disulfide melting at 104° C. The yield is 2 parts by weight.

*Elementary analysis.*—Calc'd for $C_{20}H_{25}FN_4O_2S_2$ (percent): F, 4.35; N, 12.84; S, 14.69. Found (percent): F, 4.21; N, 12.64; S, 14.53.

EXAMPLE 16

To a solution of 3.35 parts by weight of thiamine hydrochloride in 25 parts by volume of water is added a solution of 1.2 parts by weight of sodium hydroxide in 3 parts by volume of water and the resultant solution is allowed to stand at room temperature for 30 minutes.

An aqueous solution (10 parts by volume) of sodium 2-(4-fluorophenyl)ethylthiosulfate is prepared from 2.04 parts by weight of 2-(4-fluorophenyl)ethyl bromide and 3.00 parts by weight of crystalline sodium thiosulfate after the manner described in Example 1. The aqueous solution is admixed with the said thiamine solution to give oily substance. The oily substance is subjected to extraction with 25 parts by volume of chloroform. The resultant extract is washed with water, dried with anhydrous magnesium sulfate, and concentrated under reduced pressure to give oily residue. The residue is crystallized from benzene to give 3.5 parts by weight of thiamine 2-(4-fluorophenyl)ethyl disulfide as colorless prisms melting at 113° to 114° C.

*Elementary analysis.*—Calc'd for $C_{20}H_{25}FN_4O_2S_2$ (percent): F, 4.35; N, 12.84; S, 14.69. Found (percent): F, 4.38; N, 12.53; S, 14.46.

EXAMPLE 17

To a solution of 3.35 parts by weight of thiamine hydrochloride in 25 parts by volume of water there is added a solution of 1.2 parts by weight of sodium hydroxide in 3 parts by volume of water and the resultant solution is allowed to stand at room temperature for 30 minutes.

An aqueous solution (10 parts by volume) of sodium 2-(2-chlorophenyl)ethylthiosulfate is prepared from 2.2 parts by weight of 2-(2-chlorophenyl)ethyl bromide and 3.00 parts by weight of crystalline sodium thiosulfate after the manner described in Example 1. The aqueous solution is admixed with the said thiamine solution to give oily substance. The oily substance is subjected to extraction with 25 parts by volume of chloroform. The chloroform layer is washed with water, dried with anhydrous magnesium sulfate, and concentrated under reduced pressure to give oily residue. Crystallization of the residue from ethyl acetate gives colorless prisms of thiamine 2-(2-chlorophenyl)ethyl disulfide melting at 117° C. The yield is 1.7 parts by weight.

*Elementary analysis.*—Calc'd for $C_{20}H_{25}ClN_4O_2S_2$ (percent): C, 53.02; H, 5.56; N, 12.37. Found (percent): C, 52.89; H, 5.66; N, 12.10.

EXAMPLE 18

To a solution of 3.35 parts by weight of thiamine hydrochloride in 25 parts by volume of water there is added a solution of 1.2 parts by weight of sodium hydroxide in 3 parts by volume of water and the resultant solution is allowed to stand at room temperature for 30 minutes.

An aqueous solution (10 parts by volume) of sodium 2-(4-chlorophenyl)ethylthiosulfate is prepared from 2.19 parts by weight of 2-(4-chlorophenyl) bromide and 3.00 parts by weight of crystalline sodium thiosulfate after the manner described in Example 1. The aqueous solution is admixed with the said thiamine solution to give oily substance. The oily substance is subjected to extraction with 25 parts by volume of chloroform. The chloroform layer is washed with water, dried with anhydrous magnesium sulfate, and concentrated under reduced pressure to give oily residue. The residue is crystallized from benzene to give colorless prisms of thiamine 2-(4-chlorophenyl)ethyl disulfide melting at 128° C. The yield is 3.0 parts by weight.

*Elementary analysis.*—Calc'd for $C_{20}H_{25}ClN_4O_2S_2$ (percent): C, 53.02; H, 5.56; N, 12.37. Found (percent): C, 53.36; H, 5.54; N, 12.23.

EXAMPLE 19

To a solution of 1.7 parts by weight of thiamine hydrochloride in 13 parts by volume of water is added a solution of 0.6 part by weight of sodium hydroxide in 1.5 parts by volume of water and the resultant solution is allowed to stand at room temperature for 30 minutes.

An aqueous solution (10 parts by volume) of sodium 2-(3-chlorophenyl)ethylthiosulfate is prepared from 1.0 part by weight of 2-(3-chlorophenyl)ethyl bromide and 1.5 parts by weight of crystalline sodium thiosulfate after the manner described in Example 1. The aqueous solution is admixed with the said thiamine solution to give oily substance. The oily substance is subjected to extraction with 15 parts by volume of chloroform. The chloroform layer is washed with water, dried with anhydrous magnesium sulfate, and concentrated under reduced pressure to give oily residue. The residue is crystallized from benzene to give colorless prisms of thiamine 2-(3-chlorophenyl)ethyl disulfide melting at 124° C. The yield is 1.4 parts by weight.

*Elementary analysis.*—Calculated for $C_{20}H_{25}ClN_4O_2S_2$ (percent): C, 53.02; H, 5.56; N, 12.37. Found (percent): C, 52.89; H, 5.66; N, 12.10.

EXAMPLE 20

To a solution of 5.1 parts by weight of thiamine hydrochloride in 30 parts by volume of water there is added a solution of 1.8 parts by weight of sodium hydroxide in 20 parts by volume of water and the resultant solution is allowed to stand at room temperature for 30 minutes.

An aqueous solution (15 parts by volume) of sodium 2-(2,6-dichlorophenyl)ethylthiosulfate is prepared from 3.8 parts by weight of 2 - (2,6 - dichlorophenyl)ethyl bromide and 3.7 parts by weight of crystalline sodium thiosulfate after the manner described in Example 1. The aqueous solution is admixed with the said thiamine solution to give oily substance. The oily substance is subjected to extraction with 40 parts by volume of chloroform. The chloroform layer is washed with water, dried with anhydrous magnesium sulfate, and concentrated under reduced pressure to give oily residue. Crystallization of the residue from a mixture of ethyl acetate and diethyl ether gives thiamine 2-(2,6-dichlorophenyl)ethyl disulfide melting at 107° to 108° C. The yield is 0.3 part by weight.

*Elementary analysis.*—Calculated for $C_{20}H_{24}Cl_2N_4O_2S_2$ (percent): C, 49.30; H, 4.96; N, 11.49. Found (percent): C, 49.30; H, 5.08; N, 11.29.

EXAMPLE 21

A solution of 0.399 part by weight of thiamine O-monophosphate hydrochloride in 4 parts by volume of 1 N-sodium hydroxide is allowed to stand at room temperature for 30 minutes. 0.335 part by weight of crystals of S-2,6-dichlorobenzylsulfenyl isothiourea hydrochloride is added little by little to the solution and the resultant mixture is allowed to stand for 10 minutes. The mixture is admixed with 10 parts by volume of ethyl acetate under vigorous shaking and the water layer is separated therefrom. The water layer is adjusted to pH 3 with 2 N-hydrochloric acid and then the inside wall of the vessel holding the water layer is rubbed under ice-cooling to give precipitates. After being collected and washed with water, the precipitates are dissolved in 50 parts by volume of acetone and the resultant solution is allowed to stand for a night. The solution is subjected to filtration. The filtrate is concentrated and evaporated under reduced pressure to give residue. The residue is admixed with 5 parts by volume of 99% ethyl alcohol and then the inside wall of the vessel holding the mixture is rubbed to give colorless powdery crystals of thiamine O-monophosphate 2,6-dichlorobenzyldisulfide. Melting point: 191° to 193° C. (decomposition).

*Elementary analysis.*—Calc'd for $C_{19}H_{24}Cl_2N_4O_5PS_2$ (percent): C, 41.16; H, 4.36; N, 10.11; P, 5.59. Found (percent): C, 41.20; H, 4.10; N, 10.01; P, 5.74.

EXAMPLE 22

A solution of 0.399 part by weight of thiamine O-monophosphate hydrochloride in 4 parts by volume of 1

N-sodium hydroxide is allowed to stand at room temperature for 30 minutes. 0.296 part by weight of crystals of S-4-chlorobenzylsulfenyl isothiourea hydrochloride is added little by little to the solution and the resultant mixture is allowed to stand for 10 minutes. The mixture is admixed with 10 parts by volume of ethyl acetate under vigorous shaking and the water layer is separated therefrom. The water layer is adjusted to pH 3 with 2 N-hydrochloric acid and then the inside wall of the vessel holding the water layer is rubbed under ice-cooling to give colorless powdery crystals of thiamine o-monophosphate 4-chlorobenzyl disulfide. The yield is 0.305 part by weight. Recrystallization from water gives colorless prisms melting at 175° to 178° C. (decomposition).

*Elementary analysis.*—Calc'd for $$C_{19}H_{25}ClN_4O_5PS_2 \cdot H_2O$$

(percent): C, 42.42; H, 5.06; N, 10.41; P, 5.76. Found (percent): C, 42.35; H, 4.48; N, 10.29; P, 5.78.

EXAMPLE 23

The same procedures as in the preceding examples are repeated to obtain the compounds listed below, which are all novel, fall within the scope of the Formula I, and have the same utilities as hereinbefore set forth.

| Compound | Crystal form | | Melting point (° C.) | Molecular formula | Elementary analysis | | | | | |
|---|---|---|---|---|---|---|---|---|---|---|
| | Crystal form | Solvent employed | | | Calculated | | | Found | | |
| | | | | | C | H | N | C | H | N |
| O-nicotinoylthiamine 2-chlorobenzyl disulfide | Prisms | Benzene-diethyl ether(1:1) | 113–115 | $C_{25}H_{26}ClN_5O_3S_2$ | 55.19 | 4.82 | 12.87 | 55.02 | 4.91 | 12.52 |
| O-acetylthiamine 2-fluorobenzyl disulfide | do | CCl$_4$ | 133–134 | $C_{21}H_{25}FN_4O_3S_2$ | | | 12.06 | | | 11.63 |
| O-acetylthiamine 2-chlorobenzyl disulfide | do | Ethyl acetate | 127–129 | $C_{21}H_{25}ClN_4O_3S_2$ | 52.43 | 5.24 | 11.64 | 52.20 | 5.07 | 11.42 |
| O-propionylthiamine 2-chlorobenzyl disulfide | Needles | do | 143–145 | $C_{22}H_{27}ClN_4O_3S_2$ | 53.37 | 5.45 | 11.32 | 53.48 | 5.51 | 11.43 |
| O-ethoxycarbonylthiamine 2-fluorobenzyl disulfide | do | Ligroin | 126–128 | $C_{22}H_{27}FN_4O_4S_2$ | | | 11.33 | | | 11.29 |
| O-(4-chlorobenzoyl)-thiamine 2-fluorobenzyl disulfide | Prisms | Benzene-ligroin (1:1) | 115–117 | $C_{26}H_{26}ClFN_4O_3S_2$ | | | 9.98 | | | 9.75 |
| O-acetylthiamine 4-chlorobenzyl disulfide | Granular | CCl$_4$-diethyl ether | 86–89 | $C_{19}H_{23}ClN_4O_2S_2$ | 52.43 | 5.24 | 11.64 | 51.96 | 5.25 | 11.55 |
| Thiamine 1-(2-chlorophenyl)ethyl disulfide | Needles | Ethanol | 151–153 | $C_{20}H_{25}ClN_4O_2S_2$ | 53.02 | 5.56 | 12.37 | 53.03 | 5.67 | 12.15 |
| Thiamine 1-(2,6-dichlorophenyl)ethyl disulfide | Prisms | Ethyl acetate-ligroin | 153–154 | $C_{20}H_{24}Cl_2N_4O_2S_2$ | 49.30 | 4.96 | 11.49 | 48.91 | 5.01 | 11.45 |
| Thiamine 2-bromo benzyl disulfide | Needles | Benzene-ethyl acetate (2:1) | 119–121 | $C_{19}H_{23}BrN_4O_2S_2$ | 47.20 | 4.79 | 11.57 | 47.41 | 4.66 | 11.39 |
| Thiamine 1-(4-chlorophenyl)ethyl disulfide | Powdery | Ethanol | *169–170 | $C_{20}H_{25}ClN_4O_2S_2$ | 53.02 | 5.56 | 12.37 | 52.74 | 5.64 | 11.97 |

*Decomposition.

Having thus disclosed the invention what is claimed is:

1. A thiamine derivative selected from the group consisting of derivatives having the formula:

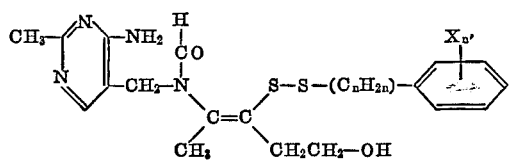

wherein $n$ is an integer from 1 to 5 inclusive, $n'$ is an integer from 1 to 3 inclusive and each X is a halogen selected from the group consisting of fluorine, chlorine, bromine and iodine and pharmaceutically acceptable salts thereof.

2. A pharmaceutically acceptable salt of a thiamine derivative according to claim 1.

3. A pharmaceutically acceptable salt according to claim 2, namely, hydrochloride.

4. A thiamine derivative according to claim 1, wherein the alkylene represented by —($C_nH_{2n}$)— is a member selected from the group consisting of methylene; 1,1-alkylene shown by

in which R' is an alkyl having up to 4 carbon atoms; ethylene; and 1-alkylethylene shown by

in which R'' is an alkyl having up to 3 carbon atoms.

5. A thiamine derivative according to claim 4, wherein the alkylene is methylene.

6. A thiamine derivative according to claim 1, the derivative being thiamine 2-fluorobenzyl disulfide.

7. A thiamine derivative according to claim 1, the derivative being thiamine 2-chlorobenzyl disulfide.

References Cited

UNITED STATES PATENTS

| | | | |
|---|---|---|---|
| 2,833,768 | 5/1958 | Fujiwara et al. | 260—256.5 |
| 3,090,785 | 5/1963 | Sunagawa et al. | 260—256.5 |
| 3,433,789 | 3/1969 | Fusco et al. | 260—256.5 |

FOREIGN PATENTS

| | | | |
|---|---|---|---|
| 89,484 | 10/1960 | Denmark | 260—256.5 |

NICHOLAS S. RIZZO, Primary Examiner

R. J. GALLAGHER, Assistant Examiner

U.S. Cl. X.R.

424—255